Figure 1:
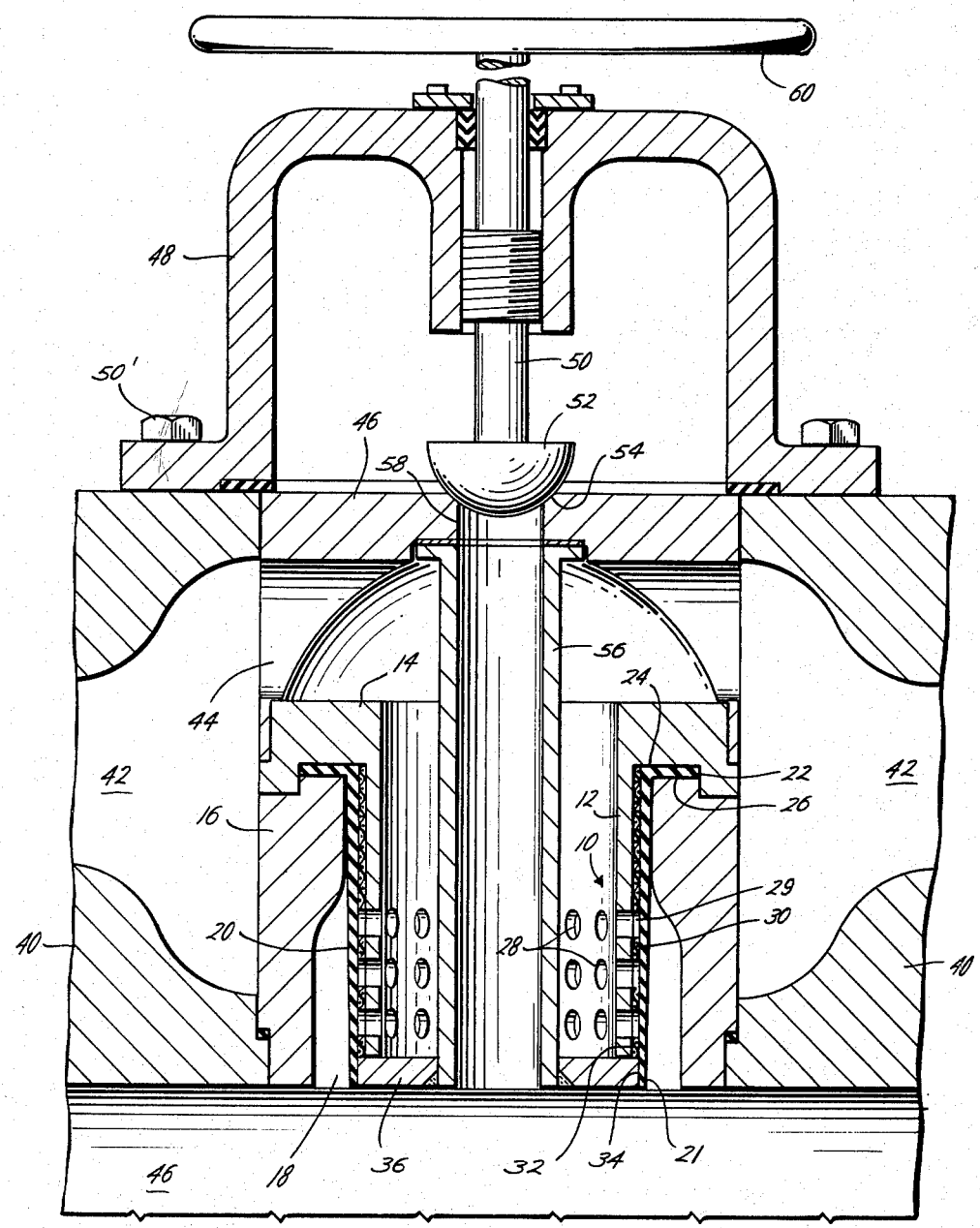

John M. Haring
INVENTOR.

April 20, 1965 J. M. HARING 3,179,124
VALVE
Filed Oct. 15, 1962 3 Sheets-Sheet 2
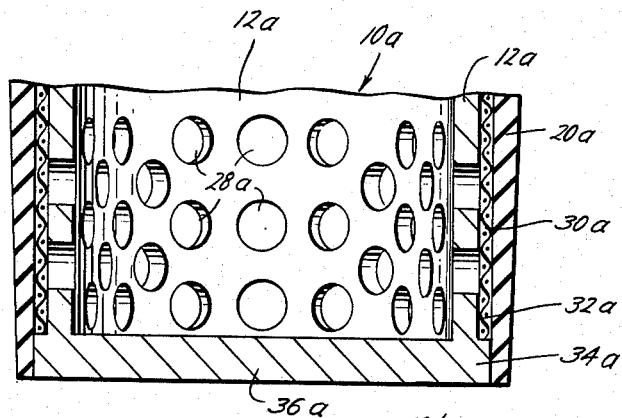
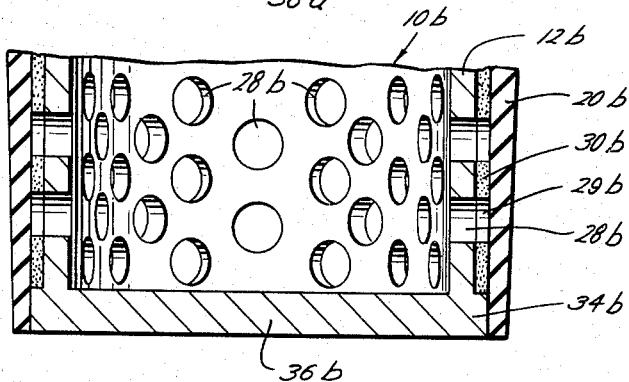
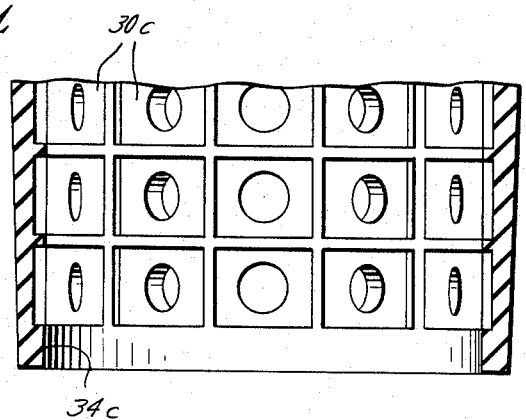
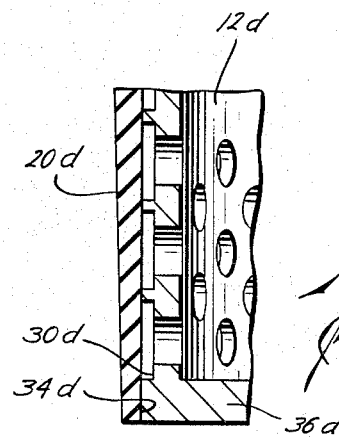
John M. Haring
INVENTOR.
BY James F. Weiler
Jefferson D. Hiller
William A. Stout &
Paul L. DeVester II
ATTORNEYS

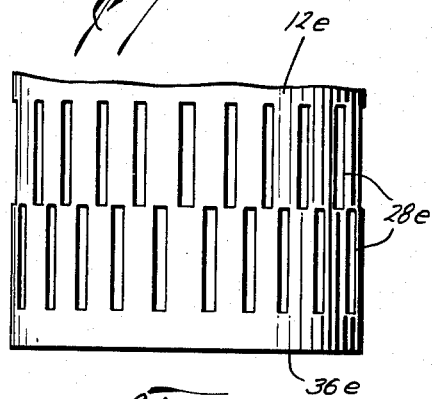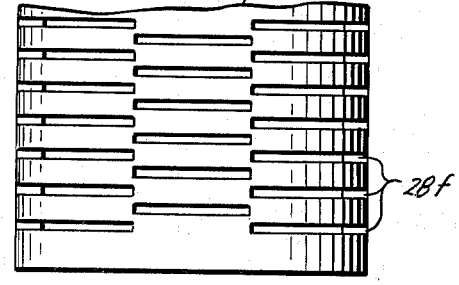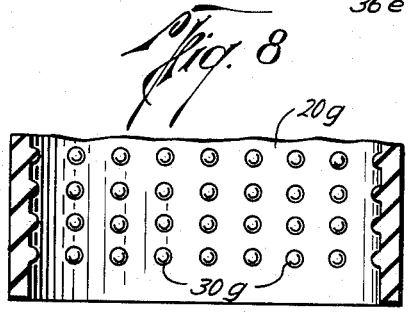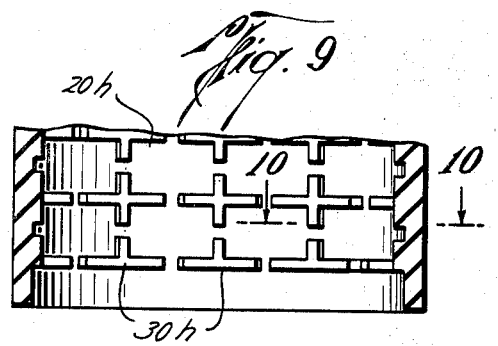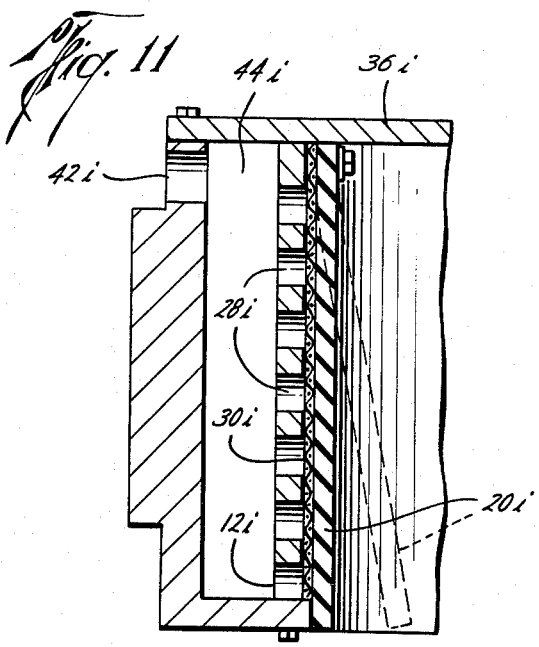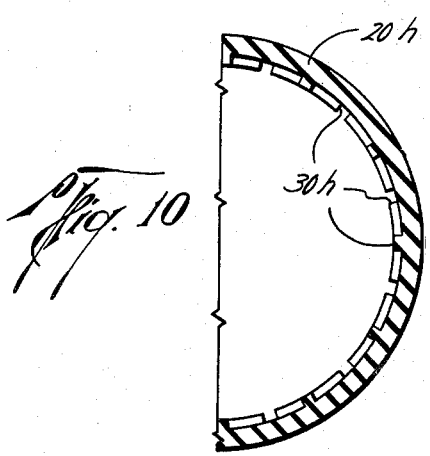

United States Patent Office 3,179,124
Patented Apr. 20, 1965

3,179,124
VALVE
John M. Haring, P.O. Box 22587, Houston 27, Tex.
Filed Oct. 15, 1962, Ser. No. 230,326
8 Claims. (Cl. 137—516.11)

The present invention relates to valves and particularly to valves used in connection with reciprocating engines or reciprocating machinery, such as compressors, pumps and the like.

The present invention is directed toward valves utilizing a flexible valve member which flexes away from and against a valve surface for opening and closing the valve, and particularly where the flexible valve surface and flexible valve are generally cylindrical. While valves of this type have been proposed for many uses, they have not been entirely satisfactory for use requiring rapid opening and closing over extended periods of time, for example, in using the valve with reciprocating machinery, such as compressors, engines and the like, but have been proposed in the main for use as check-type valves and the like. Previously valves of this general type have not been satisfactory for use with reciprocating machinery because of the power requirements to open the valve and to keep it open, and the pressure drop across the valve.

It would be highly advantageous to provide a valve of this general class which may satisfactorily be used with reciprocating machinery, such as engines, compressors and the like, of structural strength for high pressures and of high volumetric efficiency, which requires a relatively low pressure differential to open the valve, in which there is a relatively low pressure drop through the valve and required to keep the valve open during the displacement part of the stroke, in which there is relatively more flow area through the valve yet which is strong and rugged, and which provides a trouble-free service for relatively longer periods of time due to non-breakage from foreign material such as weld slag, buckshot, and other materials in the gas passing through the valve. The present invention is directed to such a valve.

It is therefore an object of the present invention to provide a valve particularly adapted for use with reciprocating machinery, such as gas and air compression machinery, engines and the like, of structural strength sufficient for high pressures and of high volumetric efficiency.

It is a further object of the present invention to provide such a valve for reciprocating machinery, such as gas and air compression machinery, engines and the like, in which there is a relatively low pressure drop through the valve and a relatively low pressure drop required to open the valve and to keep the valve open during the displacement part of the stroke.

Yet a further object of the present invention is the provision of such a valve particularly suited for use with reciprocating machinery, such as gas and air compression machinery, engines and the like, in which there is provided a relatively large flow area through the valve yet which valve will withstand high pressures.

Yet a further object of the present invention is the provision of such a valve particularly suited for reciprocating machinery, such as gas and air compression machinery, engines and the like, which provides for trouble-free service over relatively long periods of time, in which breakage from foreign material in the gas is substantially minimized, and in which there is less chance of destroying the piston or the cylinder walls in the event a portion of the valve member ruptures.

Yet a further object of the present invention is the provision of such a valve particularly suited for reciprocating machinery, such as gas and air compression machinery, engines and the like, which has a relatively high volumetric efficiency in that more flow area is provided, the flow is streamlined and provides a steady flow rate, in which there is a lower pressure deferential required to open the valve and therefore less power loss, and in which there is a minimum pressure drop required to keep the valve open during the displacement part of the stroke, and one which is rugged, substantially trouble-free for extended periods of time and which is easily assembled, replaced and maintained or repaired.

Other and further objects, features and advantages of the present invention will be apparent from the following description of presently-preferred embodiments thereof, given for the purpose of disclosure, taken in conjunction with the accompanying drawings, in which like parts are designated by like references throughout the several views and where FIGURE 1 is an elevational view, in section, illustrating a valve according to the invention illustrated for use as a suction valve for gas and air compression machinery, and illustrating an unloading valve of the globe-type, FIGURE 2 is an enlarged, fragmentary view, in section, illustrating a modification of the valve structure of FIGURE 1, FIGURE 3 is a view similar to that of FIGURE 2 illustrating a further modification, FIGURE 4 is a view similar to that of FIGURES 2 and 3 illustrating a modified form of the flexible valve element, FIGURE 5 is a fragmentary view similar to that of FIGURES 2, 3 and 4 illustrating a still further modification of the valve wall member, FIGURE 6 is a fragmentary elevational view illustrating a modified form of valve wall member, FIGURE 7 is a view similar to that of FIGURE 6 illustrating a still further modification of the valve wall member, FIGURE 8 is a fragmentary, sectional, elevational view illustrating a further modified form of the flexible valve element, FIGURE 9 is a view similar to that of FIGURE 8 illustrating a still further modified form of the flexible valve element, FIGURE 10 is a cross-sectional view taken along the line 10—10 of FIGURE 9, and FIGURE 11 is a fragmentary, elevational view, in section, illustrating a still further modification of a valve according to the invention.

Referring now to FIGURE 1, the valve is generally indicated by the reference numeral 10 and is shown incorporated in a valve cap unloader.

The valve includes a generally cylindrical valve member 12 provided with the radially and outwardly extending flange 14 at its upper end by which it is secured to the valve assembly body 16 provided with the annular, elongated passageway 18 surrounding a portion of the valve member 12.

Secured about the valve member 12 is a flexible, tubular valve member 20 which is provided with the outwardly extending radial flange 22 secured between the shoulder 24 of the flange 14 and the shoulder 26 of the valve body member 16.

Disposed within the valve member 12 are a plurality of holes or openings of relatively large diameter, generally indicated by the reference numeral 28. Preferably, the openings 28 are all of a large diameter to provide a minimum of pressure drop of the gas when passing through the valve member 12.

Disposed against the outer surface of the tubular valve member 12 are means to provide substantially instantaneous pressure substantially over the length of the tubular flexible valve member 20 adjacent the passage 18 so that pressure from within the valve member 12 is substantially immediately applied over the entire inner area of the flexible member 20 in order to provide substantially instantaneous opening of the flexible member 20 with a substantially reduced pressure deferential for opening this valve member. For this purpose, in the embodiment illustrated in FIGURE 1 a screen 30 provided with matching openings 29 to the ports 28 is disposed within a generally reduced external diameter portion 32 of the valve member 12, which stops short of the bottom, thereby providing a projecting circumferentially extending valve seat 34 against which the terminal end of the flexible valve member 20 seats.

Thus, the flexible member 20 is substantially in fluid communication with the interior of the valve member 12 throughout its area, large porting is provided, yet an effective closing of the valve is provided and one which is very strong and rugged in use.

The terminal end of the valve member 12 is closed by the closure 36 which, in this instance, constitutes a continuation of the circumferentially extending valve seat 34 so that gas entering into the chamber formed by the valve member 12 can only pass through the valve member by passing through the ports or openings 28.

Thus, pressure from within the valve 10 passes through the relatively large opening or ports 28 and, by means of the screen 30 under substantially the entire area of the flexible valve 20, pressure is instantaneously applied to the inner wall of the flexible valve 20 so that very little power is required to open the valve and to keep it open.

As previously mentioned, means to provide instantaneous pressure to the underside of a flexible valve member 20 may be accomplished in a variety of ways. For example, referring now to FIGURE 2, in which the reference letter "a" has been added to numerals corresponding to those of FIGURE 1, the screen 30a is made solid without the openings 29 as illustrated in FIGURE 1. Such an arrangement provides satisfactory results and may provide a screening action to the gases passing through the valve 10a.

Referring now to FIGURE 3, which illustrates a still further means for applying instantaneous pressure to substantially the entire underside of the flexing portion of the valve member, and in which the reference letter "b" has been added to parts corresponding to those of the preceding figures, a member 30b made of a porous material has been substituted for the screen 30 in FIGURE 1 and 30a in FIGURE 2. The porous material may be of any desired type which will withstand the conditions of use and provide substantially instant pressure to the underside of the flexible member 20b. The remaining parts and mode of operation are the same as those previously described and, if desired, openings 29b may be provided in the porous member 30b corresponding with the openings or portion 28b in the valve member 12b.

If desired, other means may be utilized in spacing the flexible valve member 20 from the valve member 12. These may take the form of projections either on the engaging side of the flexible member or on the engaged surface of the valve member 12. These may take a variety of shapes as desired. For example, referring now to FIGURE 4, where the reference letter "c" has been added to numerals designating parts corresponding to those of the preceding views, the inwardly extending projections 30c in "waffle" form are provided on the inner surface of the flexible valve member 20c and an inwardly extending circumferential flange 34c is also provided on the flexible member 20c to provide a sealing surface at the bottom of the valve member, not shown in this view. In this embodiment, the screens 30 (FIGURE 1) and 30a (FIGURE 2) and porous material 30b (FIGURE 3) may be eliminated, if desired, the waffle type projections 30c providing substantially instantaneous application of pressure substantially over the complete flexing length of the flexible valve 20c except for the sealing surface 34c.

Referring now to FIGURE 5, in which the reference letter "d" has been added to numerals corresponding to those of the preceding views, the waffle projections or grooving 30d are provided on the outer surface of the valve member 12d and the inner surface of the flexible valve member 20d is smooth. As in the embodiments of the invention illustrated in the preceding figures, pressure is applied substantially instantaneously over a substantial area of the flexible valve member 20d to provide substantially instantaneous opening of the valve and to maintain it open with a minimum of pressure drop.

The opening or ports 28 in the valve member 12 (FIGURE 1) may take a wide variety of shapes so long as there is a substantial open area or port area to provide passage of the gas through the valve member 12 without a substantial pressure drop and yet at the same time provide sufficient strength for the purpose. In this connection, it is noted that the simple spring strainer type member of the prior art, while providing a flow of gases through it with a very small pressure drop is not satisfactory as the valve member because of the limitations in its strength. It is essential that a valve member be provided which is a strong, rigid member, but in which the openings are of a large enough size so that the gases may pass through them with very little pressure drop. Variations of these passages or ports are illustrated in FIGURES 6 and 7, to which reference is now made, and in which the reference letters "e" and "f," respectively, have been added to the numerals designating corresponding parts to those of the preceding figures. Thus, in FIGURE 6, a series of axially-extending circumferentially spaced sets of elongate slots 28e, each set being staggered, are illustrated and, in FIGURE 7, the similar slots 28f are provided except that they extend in a generally circumferential direction, each of the slots in each set being axially spaced and each set of slots being staggered with respect to one another for strength purposes.

FIGURES 8 and 9, in which the reference letters "g" and "h," respectively, have been added to numerals corresponding to those of the preceding figures, illustrate further modifications for providing instantaneous and effectively complete fluid communication to the flexible valve members 20g and 20h so that they are quickly and readily opened with a minimum of pressure drop and, hence, a minimum of power loss.

Referring to FIGURE 8, the series of projections 30g are provided for this purpose and, with reference to FIGURE 9, a plurality of grooves 30h are provided in the flexible member 20h which are so provided to communicate with each of the port openings in the cooperating valve member, not shown, when in use.

It is thus apparent that the means for providing substantially instantaneous application of fluid pressure against a substantial area of the flexible valve member, except for the sealing portion of the valve member, may vary considerably and that the openings in the standing valve member may similarly assume a wide variety of shapes and forms.

Referring again to FIGURE 1, the valve assembly 10 is illustrated in use as a suction valve for gas and air compression machinery. Accordingly, there is illustrated the cylinder casting 40, in which is provided the gas flow passage 42 for inflow of gases into the passage 44 in the chair 46 secured to the flange or head 14 of the valve member 12.

Thus, in operation, gas flows in the passage 42, through the passage 44 into the interior of the valve member 12, through the ports 28, thereby causing the valve member 20 to expand or flex outwardly and permitting the gas to flow in the passage 18 into the cylinder cavity generally designated by the reference numeral 46.

While the valve 10 is applicable to all types of valves for reciprocating machinery, such as gas and air compressor valves, engine valves and the like, it is illustrated with the valve cap unloader in FIGURE 1, as previously mentioned. Thus, in this particular embodiment the valve cap 48 is bolted by the bolts 50 or otherwise secured to the cylinder casting 40 through which the valve stem 50 extends in the usual manner, and on the lower end of which is an unloader bottle valve 52 which seats against the valve seat 54 formed in the chair 46. An access tube 56 is disposed within the valve member 12 and provides access to the unloader bottle, not shown, and extends through the closure 36 and communicates with the port 58 in the chair 46.

Thus, by manually operating the hand wheel 60 in the usual manner, the globe type control valve for valve unloading is accomplished in the usual way.

When the valve is not used in connection with the valve unloading, the closure member 36 extends completely across the end of the valve member 12, such as illustrated in FIGURE 2 at 36a and in FIGURE 3 at 36b.

If desired, the flexible valve member 20 may be disposed within the valve member 12 rather than on the outside. Such an embodiment is illustrated in FIGURE 11, to which reference is now made, and in which the reference letter "i" has been added to reference numerals designating parts corresponding to those of the preceding figures. It is noted that the arrangement is the same as those previously described except that the flexible member 20i is disposed within the valve 12i and the means for providing instantaneous fluid pressure against substantially the entire flexing area of the flexible member 20i is here shown as the screen 30i. Of course, if desired, any of the modifications of the various parts previously described may be utilized in this particular embodiment.

The operation of this particular embodiment is the same as those previously described except that gas pressure enters the port 42i, passes in the passage 44i surrounding the valve 12i, through the ports 28i, and by means of a screen 30i, is applied to substantially the entire flexible area of the flexible valve member 20i causing it to move inwardly into the position shown in the dotted lines. Upon release of the pressure, or a back pressure, this member is then closed by moving it to the position illustrated.

While these valves are shown as suction valves, they may be used as discharge valves. In this event the valve body, parts 14, 16 and 20 of FIGURE 1, would be turned upside down. Also, these may or may not be of the unloading type. While these valves are especially adapted and suited for use as compressors valves, because of the relatively low valve loss, they may be used for a wide variety of purposes and particularly with reciprocating machinery in which the valves are constantly opening and closing over extended periods of time.

It is thus apparent that valves according to the present invention attain the objects and ends and have the advantages and features mentioned as well as others inherent therein.

While various presently-preferred embodiments of the invention have been given for the purpose of disclosure, and as examples of the invention, changes in details and arrangement of parts may be made which are within the spirit of the invention as defined by the scope of the appended claims.

What is claimed is:
1. A valve comprising,
a body provided with a chamber,
a generally tubular valve member closed adjacent one end and provided with an opening adjacent the other end fixed in the chamber in the body, said valve member provided with a plurality of ports disposed along a portion of its length, such ports being of a number and size to provide substantially free passage of fluid therethrough without substantial pressure drop,
a generally tubular, flexible valve member disposed against the fixed valve member, said flexible valve member being fixed adjacent the open end of the first mentioned valve member and being free to flex at its intermediate portion and other end away from the first mentioned valve member,
fluid communication means on one of the engaging surfaces of the fixed valve member and the flexible valve member spacing the flexible valve member away from the ports and providing fluid communication of pressure through the ports to the engaging surfaces of the flexible valve member not opposite the ports,
a generally tubular sealing surface on the other end of the flexible valve member sealingly engaging the fixed valve member adjacent its closed end and openable upon application of fluid pressure flow in one direction, and
inlet and outlet means in the body, one of said inlet and outlet means being disposed adjacent and being in fluid communication with the opening in the first mentioned valve member and the other of the inlet and outlet means being disposed adjacent and in fluid communication with the sealing surface of the flexible valve member whereby flow of fluid through the valve is in said one direction.

2. The valve of claim 1 where the fluid communication means comprises a screen.

3. The valve of claim 1 where the fluid communication means comprises a tubular porous material.

4. The valve of claim 1 where the fluid communication means comprises a plurality of fluid passages disposed on the flexible member.

5. The valve of claim 1 where the fluid communication means comprises a plurality of fluid passages disposed on the fixed valve member.

6. The valve of claim 1 where the fluid communication means is on the fixed valve member and includes openings therethrough matching the ports.

7. The valve member of claim 1 where the flexible member is disposed exteriorly of and about the fixed valve member.

8. The valve member of claim 1 where the flexible member is disposed interiorly of the fixed valve member.

References Cited by the Examiner
UNITED STATES PATENTS

| | | | |
|---|---|---|---|
| 1,800,066 | 4/31 | Glass | 137—525 |
| 2,098,886 | 11/37 | Safford | 137—525 |
| 2,191,458 | 2/40 | Duden | 137—512 XR |
| 2,420,056 | 5/47 | Seligmann | 137—454.4 |
| 2,548,374 | 4/51 | Janson | 137—525.3 XR |
| 2,651,322 | 9/53 | Hendry | 137—525.3 XR |
| 2,662,485 | 12/53 | Ilfrey | 137—525 XR |
| 2,757,685 | 8/56 | Fritsch | 137—516.15 XR |
| 2,896,661 | 7/59 | Becker | 137—512.3 |

FOREIGN PATENTS

| | | |
|---|---|---|
| 323 | 2/61 | Great Britain. |
| 367,459 | 1/39 | Italy. |
| 767,082 | 10/51 | Germany. |

MARTIN P. SCHWADRON, *Acting Primary Examiner.*